June 29, 1937.  S. H. GRATTAN  2,085,095
ROTARY CUTTER
Filed April 26, 1935
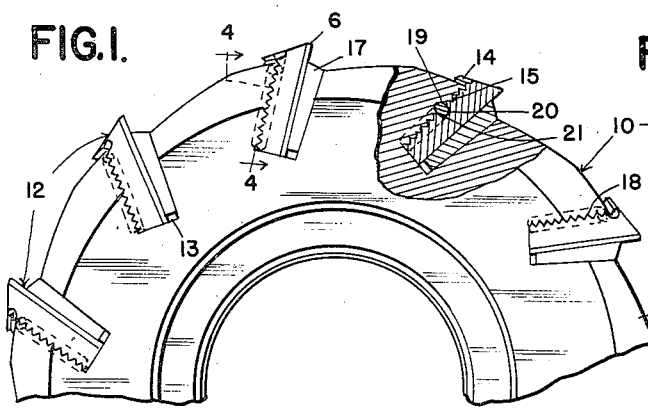
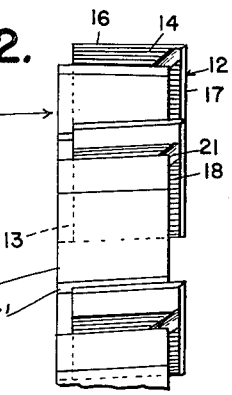
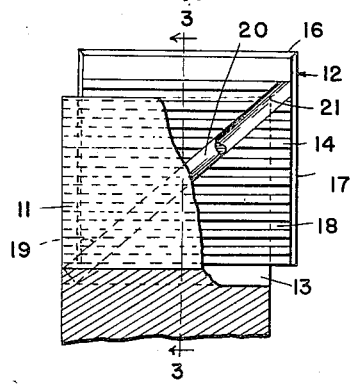
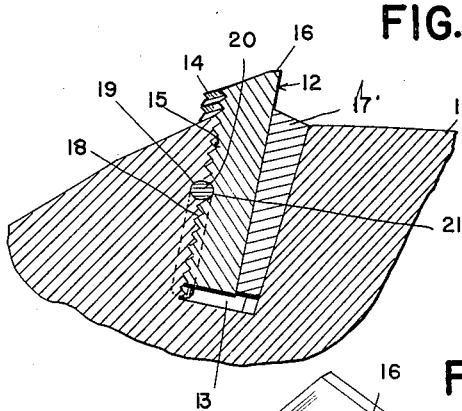
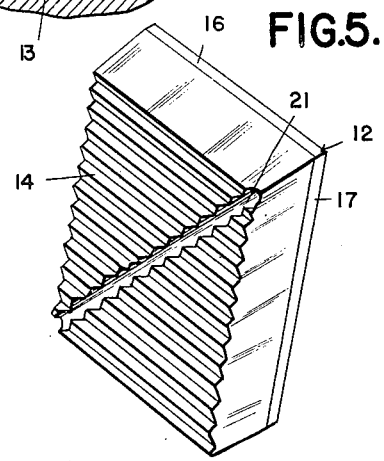
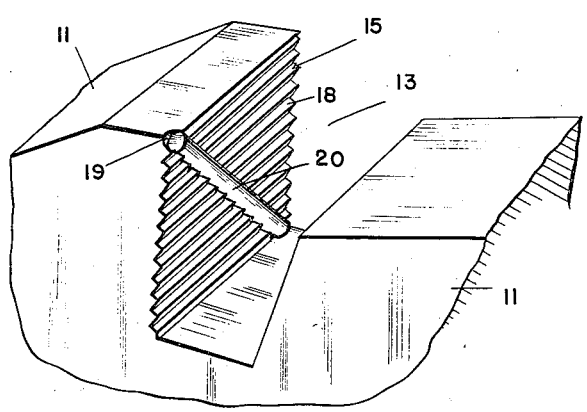
INVENTOR
STANLEY H. GRATTAN
BY Whittemore Hulbert
Whittemore Belknap
ATTORNEYS Patented June 29, 1937

2,085,095

UNITED STATES PATENT OFFICE 2,085,095

ROTARY CUTTER

Stanley H. Grattan, Detroit, Mich., assignor to Goddard & Goddard Company, Detroit, Mich., a corporation of Michigan Application April 26, 1935, Serial No. 18,471

4 Claims. (Cl. 29—105)

This invention relates generally to rotary cutters and refers more particularly to cutters of the type having removable, as well as adjustable, cutting blades.

Rotary cutters of the type employed in the past usually consisted of a rotary cutter head having a plurality of circumferentially spaced transverse slots in the peripheral portion thereof adapted to cooperate with various different types of means to secure blades to the head with the outer cutting edges of the blades set out beyond the periphery of the head and with the side cutting edges extending beyond one side of the head. Owing to the fact that the cutting edges of the blades become worn and must be periodically reground to maintain their cutting efficiency, it has been proposed in the past to adjustably secure the blades in the slots in such a manner as to permit the extent of set-out of the cutting edges of the blades to be varied in accordance with the reduction of the cutting edges. Although the principles involved in the general type of cutters briefly outlined above, are satisfactory, nevertheless, the means heretofore employed for adjustably securing the blades to the cutter head is lacking in many respects, and it is, therefore, one of the principal objects of this invention to improve materially the means utilized for this purpose. In accordance with this invention, the blades may be readily inserted into or removed from the head, and both the radial as well as the longitudinal set-out of the cutting edges of the blades may be predetermined within limits.

Another advantageous feature of this invention consists in the provision of a rotary cutter, wherein adjustment of the radial set-out of the outer cutting edges of the blades controls or automatically effects an adjustment of the longitudinal set-out of the side cutting edges of the blades, and wherein maximum blade life is insured by providing a minimum set-out of the aforesaid cutting edges.

A further feature of this invention resides in the provision of a cutter of the type previously set forth, wherein one face of each blade engages the adjacent face of the associated slot in the head, and wherein cooperating engaging means upon the faces not only absorb the longitudinal thrust exerted on the side cutting edges of the blades, but also operate to automatically vary the extent of set-out of the side cutting edges in dependence upon adjustment of the blades outwardly with respect to the head to vary the radial set-out of the outer cutting edges. This construction provides for obtaining the results set forth in the preceding paragraph and, therefore, is an important feature of this invention.

A further object of the present invention consists in the provision of a rotary cutter of the character defined in the preceding paragraph having cooperating interengaging serrations on the adjacent surfaces of the blades and side walls of the slots extending substantially parallel to the axis of rotation of the cutter, or in other words, extending normal to the line of cutting thrusts on the outer cutting edges of the blades, so as to effectively absorb any radial thrusts without the danger of displacing the blades. In the present instance, the serrations have a predetermined pitch which renders it possible to not only provide for obtaining a minimum set-out of the cutting edges of the blades previously referred to, but also offers the possibility of predetermining the radial, as well as the longitudinal set-out within limits, as will be more fully hereinafter set forth, especially when considered in connection with the accompanying drawing, wherein:

Figure 1 is a fragmentary side elevational view of a rotary cutter equipped with removable blades adjustably secured to the head in accordance with this invention;

Figure 2 is a plan view of the construction shown in Figure 1;

Figure 3 is a cross sectional view taken on the line 3—3 of Figure 4;

Figure 4 is a sectional view taken on the line 4—4 of Figure 1;

Figure 5 is a perspective view of one of the blades; and

Figure 6 is a fragmentary perspective view of the cutter head with one of the blades removed.

Referring now to the drawing, it will be noted that there is illustrated in Figure 1, a rotary cutter 10 comprising a head 11 and a plurality of blades 12 secured to the head in spaced relation to each other circumferentially of the latter. In the present instance, each of the blades 12 is inserted in a slot 13 formed in the peripheral portion of the head and extending transversely of the latter. As will be more fully hereinafter set forth, the blades 12 are secured in the slots 13 with the rear surfaces 14 of the blades contacting with the rear walls 15 of the slots and with the adjacent cutting edges of the blades set out with respect to the corresponding surfaces of the head 10. In the embodiment of the invention selected herein for the purpose of illustration, the top cutting edges 16 of the blades project beyond the periphery of the head 10, while the adjacent cutting edges 17 of the blades are set out beyond the front surface of the head. It will, of course, be understood that the sides of the blades are relieved in back of their cutting edges so as to provide the desired clearance and the slots 13 are preferably, although not necessarily, inclined rearwardly with respect to the direction of rotation from the front side of the head to the rear side thereof, to such an extent as to permit positioning the blades at the desired cutting angle.

In the present instance, each of the blades 12 is secured in its associated slot 13 with the rear face 14 engaging the adjacent wall of the slot by means of a flat seizing wedge 17' insertable into the slot in front of the blade. While the flat seizing wedge 17' is highly efficient, in itself, in securing the blades against movement in the slots, due to the relatively great resistance offered thereby to displacement of the blades, nevertheless, provision is made herein for positively preventing displacement of the blades with respect to the head in the direction of the cutting thrusts exerted on either or both of the cutting edges of the blades. In detail, it will be noted from Figure 3, that the rear face 14 of each blade and the adjacent wall 15 of each slot is provided with interengaging serrations 18 extending approximately parallel to the axis of rotation of the head 10, or in other words, are extended normal to the line of cutting thrusts exerted on the cutting edges 16 of the blades. The arrangement is such that any radial thrust on the blades is absorbed by the serrations 18 perpendicular to the line of greatest cutting stress and, consequently, radial displacement of the blades is positively prevented. It is also important to prevent longitudinal movement of the blades with respect to the head 10 by the cutting thrusts on the side edges 17 of the blades, and this is also accomplished in the present instance by cooperating engaging means on the rear surfaces 14 of the blades and the adjacent walls of the slots.

In detail, a semi-circular groove 19 is formed in the rear wall 15 of each of the slots 13 and the grooves extend obliquely with respect to the serrations 18 in the walls 15, or in other words, are inclined in a direction from the lower ends thereof toward the front side of the head 10. Permanently secured within each groove 19 is a cylindrical key 20, which in turn is adapted to engage in a groove 21 corresponding to the groove 19, but formed in the rear surface 14 of each of the blades 12. With the above construction, it will be apparent that when the wedges 17' are in their positions in the slots 13 in advance of the blades 12, the cooperating serrations 18 are interengaged and the keys 20 fixed to the walls 15 of the slots are received by the grooves 21 in the adjacent surfaces 14 of the blades. Consequently, radial and/or longitudinal displacement of the blades relative to the rotary cutter head is positively prevented.

It has been previously pointed out that provision is made for adjusting the blades in their respective slots to vary the extent of set-out of both cutting edges of each blade. This may be accomplished with the construction previously described, by drifting the wedges 17' from their positions in the slots 13 and moving the blades outwardly the desired distance. Due to the inclination of the keys 20 and their cooperating grooves 21 in the blades, outward movement of the latter also effects a slight forward movement of the same to increase the set-out of the side cutting edges 17 and extent depending upon the degree of inclination of the key. If desired, the pitch of the serrations 18 and the degree of inclination of the keys may be accurately calculated to permit predetermining the extent of set-out of the cutting edges of the blades. Assuming for example, that the pitch of the serrations 18 is one-sixteenth ($\frac{1}{16}$) of an inch, it necessarily follows that the radial set-out of the blades may be varied in multiples of one-sixteenth ($\frac{1}{16}$) of an inch. It will, of course, be understood that the extent of longitudinal set-out of the blades effected by adjusting the radial set-out one serration, will depend entirely upon the angle of inclination of the keys with respect to the plane of rotation of the head, and this angle may be calculated so as to effect a predetermined longitudinal set-out each time the blades are adjusted radially, one or more serrations. The above arrangement renders it possible to conserve the blades, or in other words, to appreciably increase the life of the latter, in that it provides a means whereby the cutting edges of the blades may be set out only the extent required for grinding the same.

Thus from the foregoing, it will be observed that I have provided relatively simple and highly effective means for adjustably securing the blades of a rotary cutter in place. It will also be apparent that my improved means insures rigidly securing the blades in the cutter head against either radial or longitudinal movement by the cutting thrusts.

What I claim as my invention is:

1. A rotary cutter comprising, a head having a slot in the peripheral portion thereof, a substantially flat blade insertable into the slot and having adjacent cutting edges set out from the corresponding surfaces of the head, means for varying the extent of set-out of one of the cutting edges with respect to the head including serrations on one face of the blade extending substantially parallel to the latter edge of the blade, corresponding serrations on the wall of the slot adjacent the serrated face of the blade to provide for varying the set-out of the last named cutting edge of the blade in multiples of the pitch of the serrations, and a key on one of said serrated surfaces obliquely disposed with respect to the serrations and slidably engaging in a correspondingly inclined groove in the other of said serrated surfaces.

2. A rotary cutter comprising, a head having a slot in the peripheral portion thereof, a blade insertable into the slot having a top cutting edge set out from the periphery of the head and having a side cutting edge set out from the front face of the head, means for varying the set-out of the top cutting edge of the blade with respect to the periphery of the head including serrations on one face of the blade extending substantially parallel to the top cutting edge of the blade, corresponding serrations on the wall of the slot adjacent the serrated face of the blade to provide for varying the set-out of the top cutting edge in multiples of the pitch of the serrations, and a key on the serrated surface of the slot inclined with respect to the serrations from the inner end toward the front face of the head and engaging a correspondingly inclined groove in the serrated face of the blade for preventing displacement of the blade relative to the head in directions parallel to the serrations and effective to varying the set-out of the side cutting edge of the blade upon varying the set-out of the top cutting edge of the blade.

3. A rotary cutter comprising, a head having a slot in the peripheral portion thereof, a blade insertable into the slot having a top cutting edge set out from the periphery of the head and having a side cutting edge set out from the front face of the head, means for varying the set-out of the top cutting edge of the blade with respect to the periphery of the head including serrations on one face of the blade extending substantially parallel to the top cutting edge of the blade, corresponding serrations on the wall of the slot adjacent the serrated face of the blade to provide for varying the set-out of the top cutting edge in multiples of the pitch of the serrations, and a key on the serrated surface of the slot inclined with respect to the serrations from the inner end toward the front face of the head and engaging a correspondingly inclined groove in the serrated face of the blade for preventing displacement of the blade relative to the head in directions parallel to the serrations.

4. A rotary cutter comprising, a head having a slot in the peripheral portion thereof, a substantially flat plate insertable into the slot and having adjacent cutting edges set out from the corresponding surfaces of the head, means for varying the extent of set-out of one of the cutting edges with respect to the head including serrations on one face of the blade extending substantially parallel to the latter edge of the blade, corresponding serrations on the adjacent wall of the slot to provide for varying the set-out of the last named cutting edge of the plate in multiples of the pitch of the serrations, and a key on one surface of the slot obliquely disposed with respect to the serrations and engageable in a correspondingly inclined groove in the adjacent side of the plate.

STANLEY H. GRATTAN.